United States Patent [19]

Gilliam

[11] 4,322,922
[45] Apr. 6, 1982

[54] METHOD OF FORMING ELECTRICAL DISCHARGE MACHINE TOOLS

[76] Inventor: Dennis D. Gilliam, 32721 Lancaster Dr., Warren, Mich. 48093

[21] Appl. No.: 136,821

[22] Filed: Apr. 3, 1980

[51] Int. Cl.³ .............................................. B24B 1/00
[52] U.S. Cl. .................................. 51/325; 76/101 A; 219/76.13; 51/295
[58] Field of Search ........ 76/101 R, 101 A, DIG. 11; 219/76.1, 76.13, 77; 204/16, 23, 26; 51/293, 295, 325, 281 R; 29/402.01, 402.05

[56] References Cited

U.S. PATENT DOCUMENTS

| | | | |
|---|---|---|---|
| 1,709,606 | 4/1929 | Catland | 219/77 |
| 1,784,015 | 12/1938 | Lane et al. | 219/77 |
| 1,791,968 | 2/1931 | Morgan | 219/77 |
| 2,494,970 | 1/1950 | Shea | 219/76.14 |
| 3,415,970 | 12/1968 | Cline | 219/76.4 |

Primary Examiner—Roscoe V. Parker
Attorney, Agent, or Firm—Barnes, Kisselle, Raisch & Choate

[57] ABSTRACT

A simplified method of making and sharpening tools used in electrical discharge machining to avoid the laborious process of making a master die, a plastic master, several graphite blocks, a steel cutting tool and a final graphite block as a finished electrode. The present process uses a Surfalloy process wherein metal is deposited on a prepared block to have a sharpness characteristic equal to that of a finished steel tool. Thus, new tools can be made in about one hour where previous steps required about 90 hours.

4 Claims, 8 Drawing Figures

SURF ALLOY PROCESS

METHOD OF FORMING ELECTRICAL DISCHARGE MACHINE TOOLS

FIELD OF INVENTION

The making of tools used in electrical discharge machining.

BACKGROUND OF INVENTION

The process of machining called Electrical Discharge Machining (EDM) is used for cutting holes, slots, and other irregular shapes which are difficult to machine with conventional cutting tools. The workpiece must be electrically conductive and the material is removed in a controlled manner by utilizing highfrequency electrical sparks to melt or vaporize the material being removed. The spark discharge results from a pulsing of direct current between the positively charged workpiece and the negatively charged tool which is generally a graphite form. A gap of 0.0005 to 0.020 inches is used with the parts surrounded by a dielectric fluid bath. Each spark melts or vaporizes a small portion, the workpiece producing cratering which erodes the portions of the workpiece to be removed.

The graphite used for the negative electrode has a rather short tool life and requires frequent replacement. The graphite tool forms are shaped by a steel cutting tool which has generally the shape of the part to be ultimately formed. The forming of this cutting tool by present methods is essentially a 90-hour process involving a plurality of steps as follows:

1. Forming a master die by hand machining to print specifications;
2. Making a plastic master die from the steel master die in a pouring process;
3. Using the plastic master as a form on a tracer machine to cut out graphite blocks identical to the plastic master;
4. Using one or more of the graphite blocks in an EDM machine to form a steel tool from a solid block, the cutting surface having a rough texture as a result of the EDM process;
5. Using the steel tool to form graphite electrodes by orbital abrading machining, that is, abrading away the graphite by contact with the rough surface on the cavity walls of the steel tool; and
6. Finally using the graphite electrodes in an EDM process to form the finished steel products.

A major drawback of the above method is that the steel cutting tool, which has a rough cutting surface, loses its sharpness after 25 to 50 electrodes are cut and requires a much longer cutting time which becomes too costly. Resharpening the tool in the numerous steps above described takes time and results in a tool which has a larger cavity as a result of eroding to get the cutting texture required. Thus, accuracy in the final product becomes more difficult. After about two resharpenings, the steel tool has to be scrapped and another made using the time consuming steps above recited.

The present invention contemplates a method of resharpening or originally creating a graphite electrode cutting tool which requires about one hour as compared with the standard procedures. Thus, time is saved and materials are saved and the resulting tools are equally satisfactory.

BRIEF DESCRIPTION OF THE DRAWINGS

DRAWINGS accompany the disclosure and the various views thereof may be briefly described as.

BRIEF DESCRIPTION OF THE INVENTION

The invention consists in utilizing a known process of resurfacing to build up and resharpen a graphite electrode cutting tool.

DETAILED DESCRIPTION OF THE INVENTION

Figure 1:
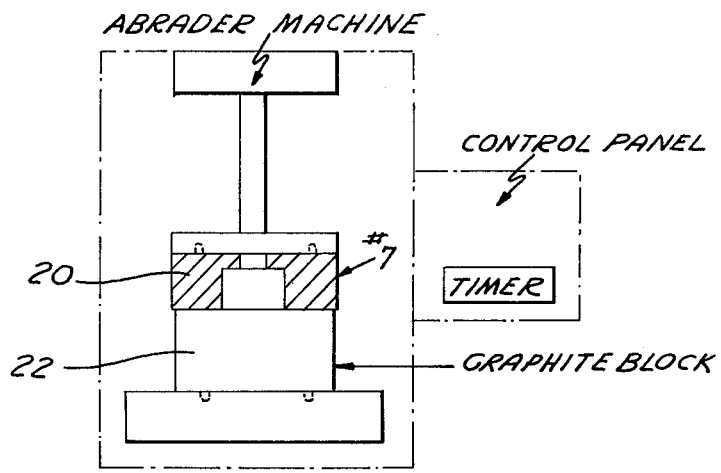
FIG. 1, a view of a machine used in cutting negative electrodes.

A graphite electrode cutting tool which is used in sharpening an electrical discharge machining negative electrode, has, for example, a female cavity as shown in FIG. 1 at 20. Since the cavity in this tool was formed by an EDM process, it is rough and pitted and has sharp ridges which enable it to erode a graphite male member shown at 22 in FIG. 1. This erosion takes place on an orbital abrading machine which rotates and orbits to erode away the portions of the graphite block not needed to form the male die.

Figure 2:
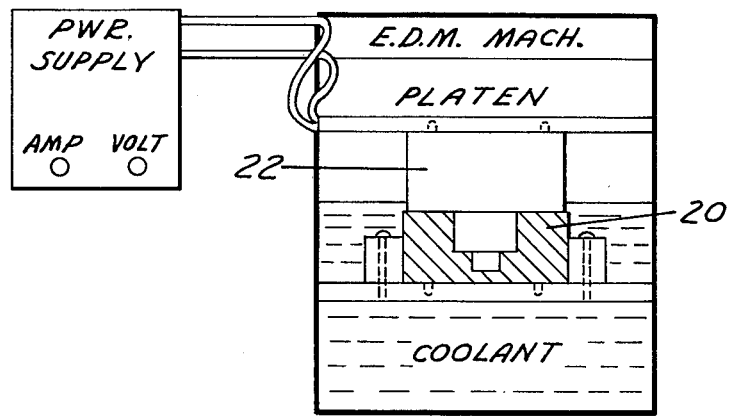
FIG. 2, a view of an EDM machine which utilizes the graphite electrodes.
Figure 3:
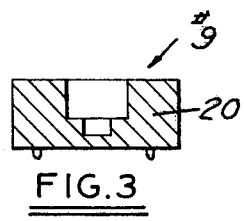
FIG. 3, a view of a completed die part.

The graphite member is then used as the negative electrode in an EDM machine shown diagramatically in FIG. 2 to form the finished die illustrated in FIG. 3. When the member 20, the steel cutting tool, has been used a certain number of times, the rough and sharp ridges wear away and it becomes ineffective in cutting the graphite electrodes.

This invention contemplates resharpening the cutting tool by subjecting it to a process known as Surf-Alloy which is a mechanical vapor diffusion process accomplished by applying a stylus of material to a surface with an electrical potential exchange which in fractions of a second melt and vaporize the contacting metals and convert it again to a solid back to ambient temperatures. This is accomplished in atmosphere at ambient temperatures with no deleterious effects on the base metal.

Figure 4:
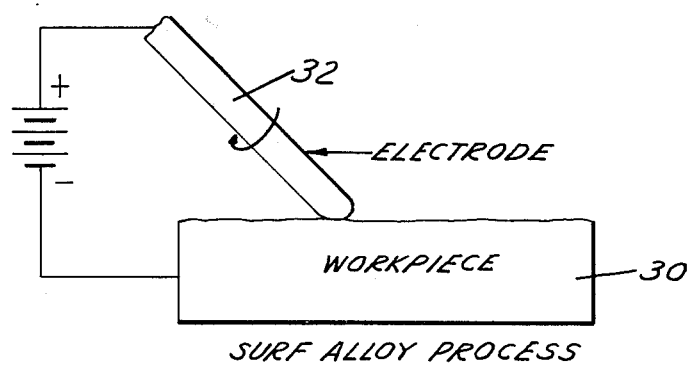
FIG. 4, a general view of a surface treatment device.

In FIG. 4, an illustration of the process is presented showing the workpiece 30 being contacted by an electrode 32 with a direct current source of electrical energy. The process and equipment for accomplishing the process is promoted by Surf-Alloy and Alloying Surfaces, Inc. of Troy, Michigan.

The process produces an alloyed surface applied by means of electrical discharge and is classed as electrical deposition.

The objective of an electrical deposition process is to harden a metal surface or change its properties by coating or changing the surface metallurgy by creating intense localized electrical heating and alloying another metal onto it.

The equipment creates a potential difference between a (usually) D.C. positively charged electrode and a grounded workpiece. This generates more heat in the electrode than in the negative workpiece and aids in the transfer of material. The depositing of carbide, or whatever the electrode material, occurs by instantaneous discharges at a point of contact between the electrode and the workpiece. In addition, immediate quenching of the heated material by the surrounding metal and the air after each discharge produces a highly desirable heat treating effect which in itself substantially increases the life of a tool by the surface hardening.

Various materials can be alloyed onto the surface of tool details. Materials can also be added by use of a slurry method. These slurries can be used to apply thicker coatings than just using a sole electrode. This uses powder-sized material in a slurry which is brushed or applied to the base metal. The electrode is then used normally. This alloys the base metal with both the slurry and electrode materials. Materials which are not suitable as electrodes can be used in a slurry.

The surface coating is actually an alloy of the base material and the electrode and the slurry, if present. Prolonged sparking increases the percentage of electrode and slurry alloyed into the surface but not the depth of the coating. An actual cross-section of the coating shows a layer of alloyed base and electrode metal on the surface. Under this layer is a layer of hardened base metal. This comes from the instant heating and cooling which takes place on the surface at the top.

The Surf-Alloy process makes use of various types of alloying materials. A variety of materials can be applied because of the nature of the process. The only factors are that the materials are electrically conductive and that they can be melted by the 3000° F. heat developed. The main electrodes used by Surf-Alloy are various grades of tungsten carbide. These are very resistance to abrasive wear. Because of the instant heating and cooling heat treatment, the material on the surface is in its hardest state. This must be taken into account when treating a surface.

The electrodes range in size from about 1/32 to ¼ of an inch. Some are hollow to allow air to pass through for cooling, or, an inert gas, such as argon, can be used to form a non-reactive, monoxidizing atmosphere around the electrode and workpiece in contact.

Metal is actually added by the process and the final surface profile may not be the same as the original surface since instantaneous melting, alloying, and hardening occur. Presently, surface finish can be controlled from as low as ten micro-inches to over one thousand micro-inches. Surface finish is inversely proportional to the relative motion rate between the electrode and workpiece, and is also dependent on current density, pressure between the electrode and workpiece, and the area of electrode contact on the surface. Therefore, a rough finish is applied with an electrode, small in diameter, which, when revolving in the applicator, has a lower surface speed than a larger one.

Using a tungsten carbide electrode, a very rough surface can also be applied to a work holding device. This rough surface can be used to substantially increase the work holding and gripping capabilities of the work holding device. With the hard tungsten carbide surface, the wear resistance is also substantially increased, thus giving the device longer life. The points actually penetrate the surface of a part instead of just putting force on the surface. The depth of penetration can be controlled as required. Electrodes of nickel-chromium can also be used and perhaps other metals for certain specific applications.

Size control of the deposited material can be controlled to within one ten-thousandth of an inch. After coating with the Surf-Alloy process, a surface requires no subsequent grinding operation. Although on smooth surfaces, Teflon, graphite, or other lubricants can be applied to reduce friction. Control over the area covered is also excellent. Only the surface which comes directly in contact with the electrode is subjected to the heating and deposited material. There is no material spattered on areas where the process is not desired. By being applied by hand, the electrode contacts the workpiece only where the operator puts it. The coverage rate is about one square inch of surface per minute.

The equipment consists of a patented power source which varies the power to the electrode. The switches vary the coatings and surfaces. The electrode holder revolves by an air motor. The speed of rotation is controlled by air flow. Power is directed through the air motor and electrode holder to the electrode. Another wire runs from the power supply to the part for ground. Air or inert gas is also directed through the electrode as needed. The coating is applied by hand.

Figure 5:
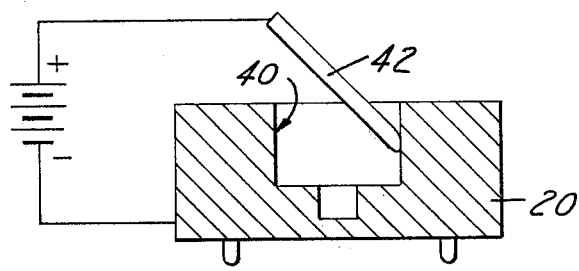
FIG. 5, a view of a surface treatment system for sharpening steel cutting tools.

In FIG. 5, an electrode cutting tool is shown with a cavity 40. Assuming that the surfaces of the cavity are worn to the extent that they no longer will effectively cut a graphite electrode, the mechanical vapor diffusion process is applied using an electrode 42 which includes such materials as tungsten carbide, titanium carbide and nickel.

Rather quickly, the electrode 42 can be worked over the surface of the tool cavity to build up the dimension of the cavity to its original dimension and also to provide the sharp abrading ridges and points which are effective in cutting the graphite. Thus, in about an hour, the tool can be restored to an effective dimension with a proper cutting surface. All of the steps previously described to form a cutting tool are eliminated.

Thus, the process according to the present invention provides a cutting tool in which no configuration detail is lost and the texture of the surface is almost identical to the EDM pattern previously used. A 90-hour process can be reduced to about 1 hour.

Figure 7:
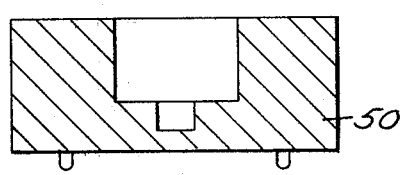
FIG. 7, a hand made die.
Figure 8:
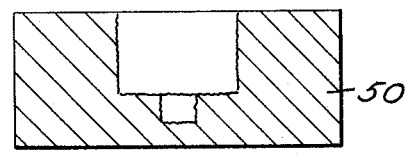
FIG. 8, a cutting tool made directly from the hand made die.

In addition, an original steel cutting tool or block 50 can be made in a fraction of the time previously used. A hand machined master die is made to about 0.070 oversize as shown in FIG. 7 on the orbit adjustment in the abrader machine. Then, the polished master is coated and roughened (FIG. 8) by the mechanical vapor diffusion process above described to obtain the cutting texture required on the electrode abrader machine, FIG. 1.

Figure 6:
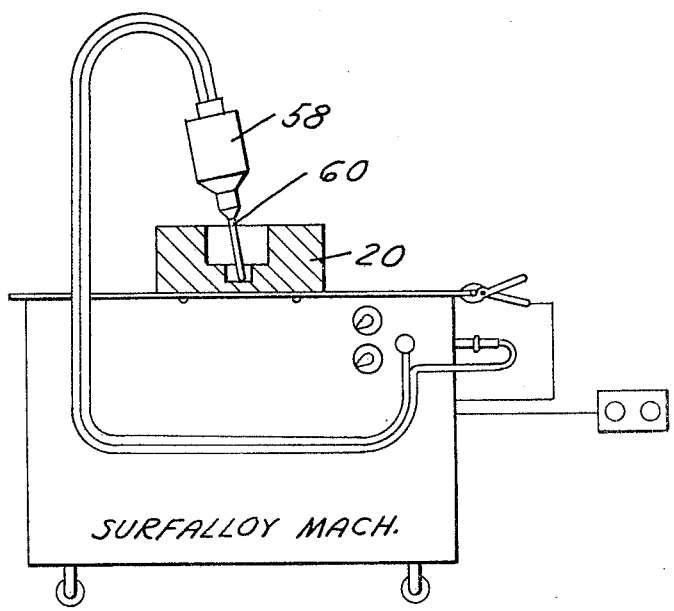
FIG. 6, a view of a Surf-Alloy machine in use.

In FIG. 6, a Surf-Alloy machine is illustrated with the tool block 20 secured to the top plate as negative electrode. The positive electrode 60 is in a handheld air driven chuck 58 with 115 volt wire to the head. The rotating electrode is made of tungsten. Thus, the surfaces of the tool 20 can be roughened and built up as desired in a relatively short period of time. The same process and equipment would be used to treat the master 50 of FIG. 7 to produce the roughed tool 50 of FIG. 8 which is ready to cut the carbon electrodes out of graphite blocks.

Thus, whether the starting tool is a hand machined master or a worn used tool, it will be slightly oversize and the surface application will bring it to size with the necessary cutting characteristics for graphite.

What I claim is:

1. A method of forming graphite electrodes to be used in an electric discharge machining process which comprises:
   (a) forming a master cutting block from a steel block by a mechanical machining process,
   (b) coating the surfaces of the steel master, which are to cut a graphite electrode, with a hard material having rough surface characteristics which permit it cut the graphite when carried in an orbiting abrading machine and applied to the graphite,
   (c) positioning the coated steel master block in an orbiting abrading machine, and
   (d) moving the block into a graphite block to form a shaped graphite electrode.

2. A method as defined in claim 1 in which said cutting block is a used cutting block with dulled surfaces to be resharpened by coating the cutting surfaces with a hard material having rough surface characteristics.

3. A method as defined in claim 1 in which the coating process is applied in a mechanical vapor diffusion process by applying a stylus of hard material to a cutting surface of the cutting tool with an electrical potential exchange.

4. A method of forming electrical discharge machining electrodes of graphite which comprises:
   (a) utilizing a steel block having the shape desired for cutting the graphite electrode with slightly oversize dimension,
   (b) coating the surface of the steel block to bring it to size and to apply a rough cutting texture by applying a hard metal to the surface in a mechanical vapor diffusion process,
   (c) positioning the coated steel master block in an orbiting abrading machine, and
   (d) moving the block into a graphite block to form a shaped graphite electrode.

* * * * *

UNITED STATES PATENT AND TRADEMARK OFFICE
CERTIFICATE OF CORRECTION

PATENT NO. : 4,322,922
DATED : April 6, 1982
INVENTOR(S) : Dennis D. Gilliam

It is certified that error appears in the above–identified patent and that said Letters Patent are hereby corrected as shown below:

Claim 1, (Col. 5, Line 9), before "cut" insert -- to --.

Signed and Sealed this

Twentieth Day of July 1982

[SEAL]

Attest:

GERALD J. MOSSINGHOFF

Attesting Officer

Commissioner of Patents and Trademarks